United States Patent [19]

Scholz

[11] 4,346,353
[45] Aug. 24, 1982

[54] MODULATOR AND DEMODULATOR CIRCUITS FOR MODIFIED DELAY MODULATION METHOD

[75] Inventor: Werner Scholz, Gehrden, Fed. Rep. of Germany

[73] Assignee: Licentia Patent-Verwaltungs-G.m.b.H., Frankfurt am Main, Fed. Rep. of Germany

[21] Appl. No.: 154,127

[22] Filed: May 29, 1980

[30] Foreign Application Priority Data

May 31, 1979 [DE] Fed. Rep. of Germany ....... 2922082

[51] Int. Cl.$^3$ .......................... H03K 7/10; H03K 9/10
[52] U.S. Cl. .................................. 332/9 R; 329/104; 360/40; 375/25; 375/110
[58] Field of Search ................. 329/50, 102, 104, 106; 332/9 R, 9 T; 375/25, 110; 360/29, 40

[56] References Cited

U.S. PATENT DOCUMENTS 3,414,894 12/1968 Jacoby .................................. 360/40
3,968,328 7/1976 Tsuchiya et al. ............... 329/104 X
4,027,335 5/1977 Miller ................................... 360/40

OTHER PUBLICATIONS

Severt, "Encoding Schemes Support High Density Digital Data Recording", Computer Design, May 1980, pp. 181-190.
Wall, "Encoding/Decoding Techniques Double Floppy Disc Capacity", Computer Design, Feb. 1980, pp. 127-135.
Hecht et al., "Delay Modulation", Proceedings of the IEEE, Jul. 1969, pp. 1314-1316.

*Primary Examiner*—Siegfried H. Grimm
*Attorney, Agent, or Firm*—Spencer & Kaye

[57] ABSTRACT

In a modulation and demodulation system for converting a binary sequence composed of a succession of bits, each having a value of "1" or "0", occurring in successive bit intervals, into a transmitted signal containing a representation of each bit, by representing a bit of one value as a change in the level of the transmitted signal at a time corresponding to the middle of the associated bit interval, and representing a bit of the other value as a change in the level of the transmitted signal at a time corresponding to the end of the associated bit interval if a further bit of the other value follows, transmitted signal level changes associated with the bits of the other value are in part suppressed for causing the time period between level changes in the transmitted signal to be no longer than the period of more than two consecutive level changes at intervals equal to each bit interval and associated with the bits of the other value.

12 Claims, 8 Drawing Figures

| $D_3$ | $D_2$ | $D_1$ | $\bar{R}$ | $\bar{S}$ | $\bar{Q}$ |
|---|---|---|---|---|---|
| 0 | 0 | 0 | 1 | 1 | ↑↓ |
| 0 | 0 | 1 | 0 | 1 | 0 |
| 0 | 1 | 0 | 1 | 0 | 0 |
| 0 | 1 | 1 | 1 | 0 | 0 |
| 1 | 0 | 0 | 1 | 0 | 0 |
| 1 | 0 | 1 | 0 | 1 | 1 |
| 1 | 1 | 0 | 0 | 1 | 1 |
| 1 | 1 | 1 | 1 | 1 | ↑↓ |

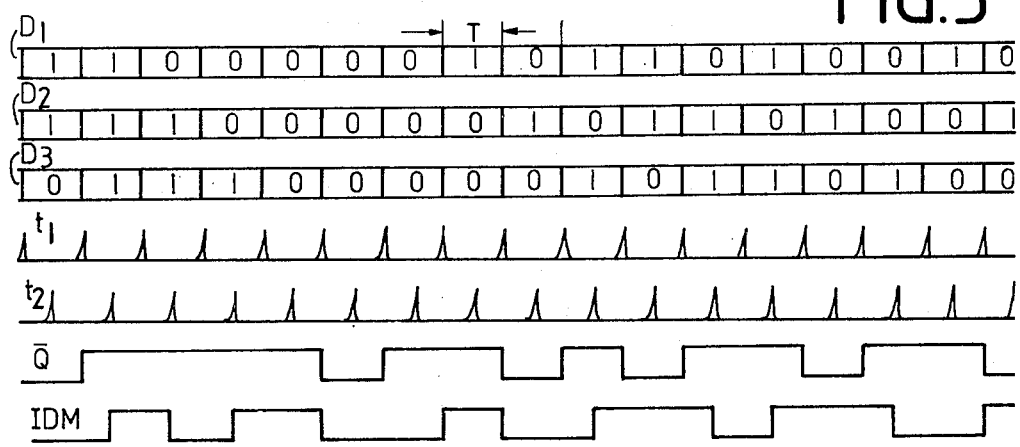
FIG. 5
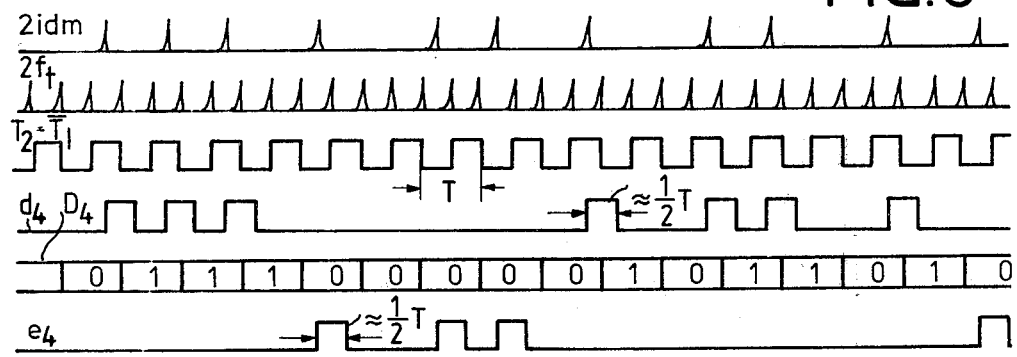
FIG. 6
Identification Process when Clock Pulse Phase is Wrong FIG. 7
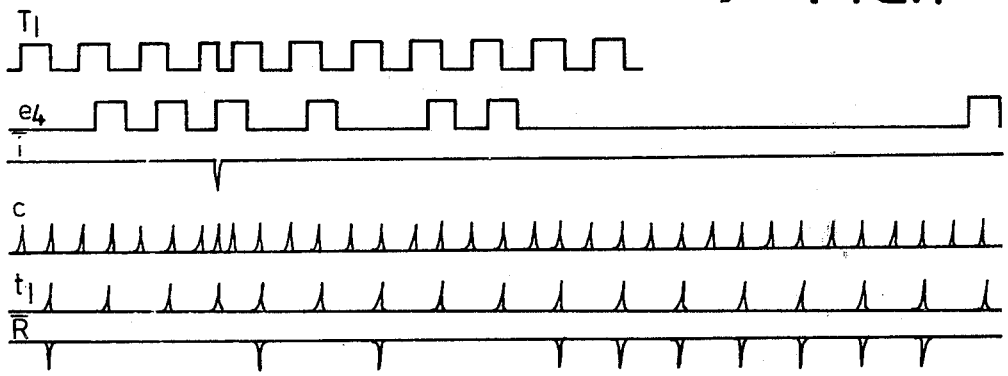

MODULATOR AND DEMODULATOR CIRCUITS FOR MODIFIED DELAY MODULATION METHOD

BACKGROUND OF THE INVENTION

The present invention relates to the transmission of a binary sequence in the form of a transmitted signal presenting level changes representing the sequence.

According to a method for transmitting a binary sequence, consisting of successive bit intervals each containing a single bit value, as disclosed in the Proceedings of the IEEE, July 1969, pages 1314–1316, the logic signals "1" and "0" are defined as follows: the logic signal "1" is represented by a level change in the middle of a bit interval: and the logic signal "0" is represented by a level change at the end of the associated bit interval if a further logic "0" signal follows immediately, there otherwise being no level change in the corresponding bit interval. This known code has the drawback that the time association of the phase of the transmitted signal to the boundaries, i.e. the beginning and end, of each bit interval of a bit pattern can be recognized only upon the occurence of the bit sequence 101. The evaluation circuit for such a bit sequence is complicated and subject to malfunction.

SUMMARY OF THE INVENTION

It is an object of the present invention to simplify the known method for transmitting binary signals in such a identification of the phase of such a transmitted signal and to reduce the danger of malfunction of the phase identification circuit at little expense.

These and other objects are achieved, according to the invention, in connection with the conversion of a binary sequence composed of a succession of bits, each having a value of "1" or "0", occurring in successive bit intervals, into a transmitted signal containing a representation of each bit, by representing a bit of one value as a change in the level of the transmitted signal at a time corresponding to the middle of the associated bit interval, and representing a bit of the other value as a change in the level of the transmitted signal at a time corresponding to the end of the associated bit interval if a further bit of the other value follows, by in part suppressing transmitted signal level changes associated with the bits of the other value for causing the time period between level changes in the transmitted signal to be no longer than the period of two bit intervals and for preventing the occurrence of more than two consecutive level changes at intervals equal to each bit interval and associated with the bits of the other value. Then, in further accordance with the invention, demodulation, or recovery of the original binary sequence, is achieved by detecting the occurrence of more than two consecutive level changes at intervals equal to each bit interval, whereby the phase of level changes associated with the one bit value is identified.

BRIEF DESCRIPTION OF THE DRAWINGS

FIGS. 5, 6 and 7 are signal pulse diagrams illustrating the operation of the circuits of FIGS. 3 and 4.

DESCRIPTION OF THE PREFERRED EMBODIMENTS

Figure 1:
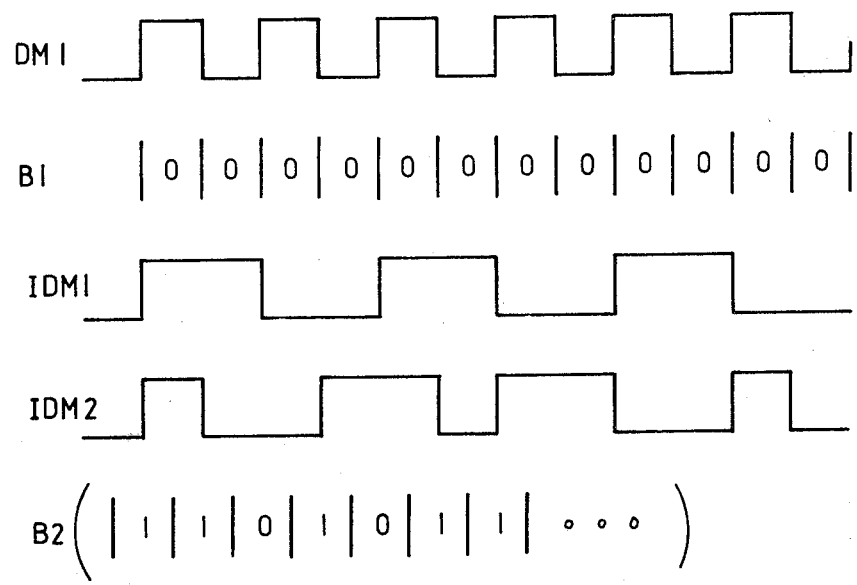
FIGS. 1 and 2 are pulse diagrams illustrating the prior art method and the method according to the invention.

FIG. 1 shows a binary, or bit interval, sequence to be transmitted which contains exclusively logic "0" signals. Above binary sequence B1 there is shown the transmitted signal DM1 obtained when the prior art delay modulation DM is used. Below the binary sequence B1 there are shown two different transmitted signals IDM1 and IDM2, designated as identified delay modulation signals, which may result if, beyond the requirements for the prior art delay modulation, the following conditions are met:

(a) the distance between successive binary signal level changes may only be one, one and a half, or two bit intervals; and (b) there may never be more than two consecutive level changes spaced one bit interval apart associated with consecutive logic signals "0". In this example logic signal "1" is represented by a level change in the middle of a bit interval, and the logic signal "0" by a level change at the end of the associated bit interval.

Figure 2:
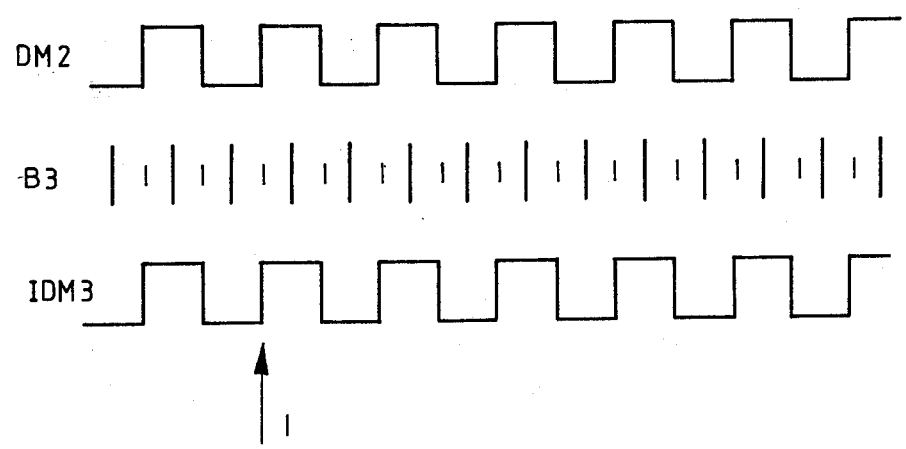

FIG. 2 shows the transmitted signal DM2 according to the prior art and the transmitted signal IDM3 according to the invention for a binary sequence B3 which contains only logic "1" signals, and illustrates that the signal representing such a bit sequence is not altered by the above requirements.

As shown in FIGS. 1 and 2, the signals DM1 and DM2 for the transmission of the two illustrated binary sequences B1 and B3 coincide, except for the phase shift, if the prior art delay modulation is used. In order to be able to identify the transmitted binary information, it is necessary to wait for the appearance of the bit sequence . . . 101 . . . from which the phase relationship between the bit signal and the associated bit interval boundaries can be derived.

The signals DM and IDM shown in FIGS. 1 and 2 themselves on the first view do not contain an information about the phase relationship with the bit interval. For example, the signal IDM2 of FIG. 1 may also be interpreted as a binary sequence B2, shown in parentheses below this signal, if the phase is identified incorrectly. But when the phase relationship is known the signals IDM1 and IDM2 are read unequivocally as the binary sequence B1. Both the signal IDM1 and IDM2 are meeting the said conditions (a) and (b). The example of a modulator described in this application (FIG. 3) produces the signal IDM1.

Based on the above-mentioned additional conditions in the formation of an IDM signal, the phase of that signal can be unequivocally identified in FIG. 2 already after three level changes. This point, at which unequivocal identification is possible, is indicated in FIG. 2 by the arrow 1. Three successive level changes spaced at one bit interval are not possible when a series of zeros are transmitted, only if three logic "1" signals appear in a row. Once the phase relationship of the signal with respect to the bit interval boundaries has been determined after transmission of three logic "1" signals, all further signals of the binary sequence can be read unequivocally.

The evaluation of three identical signals . . . 111 . . . can be realized more easily than the evaluation of the bit sequence . . . 101 . . . in the prior art DM code. In particular, the freedom from malfunction or error can be increased very easily by biasing the identification on more than three successive "1"'s instead of just three.

Figures 3, 3A:
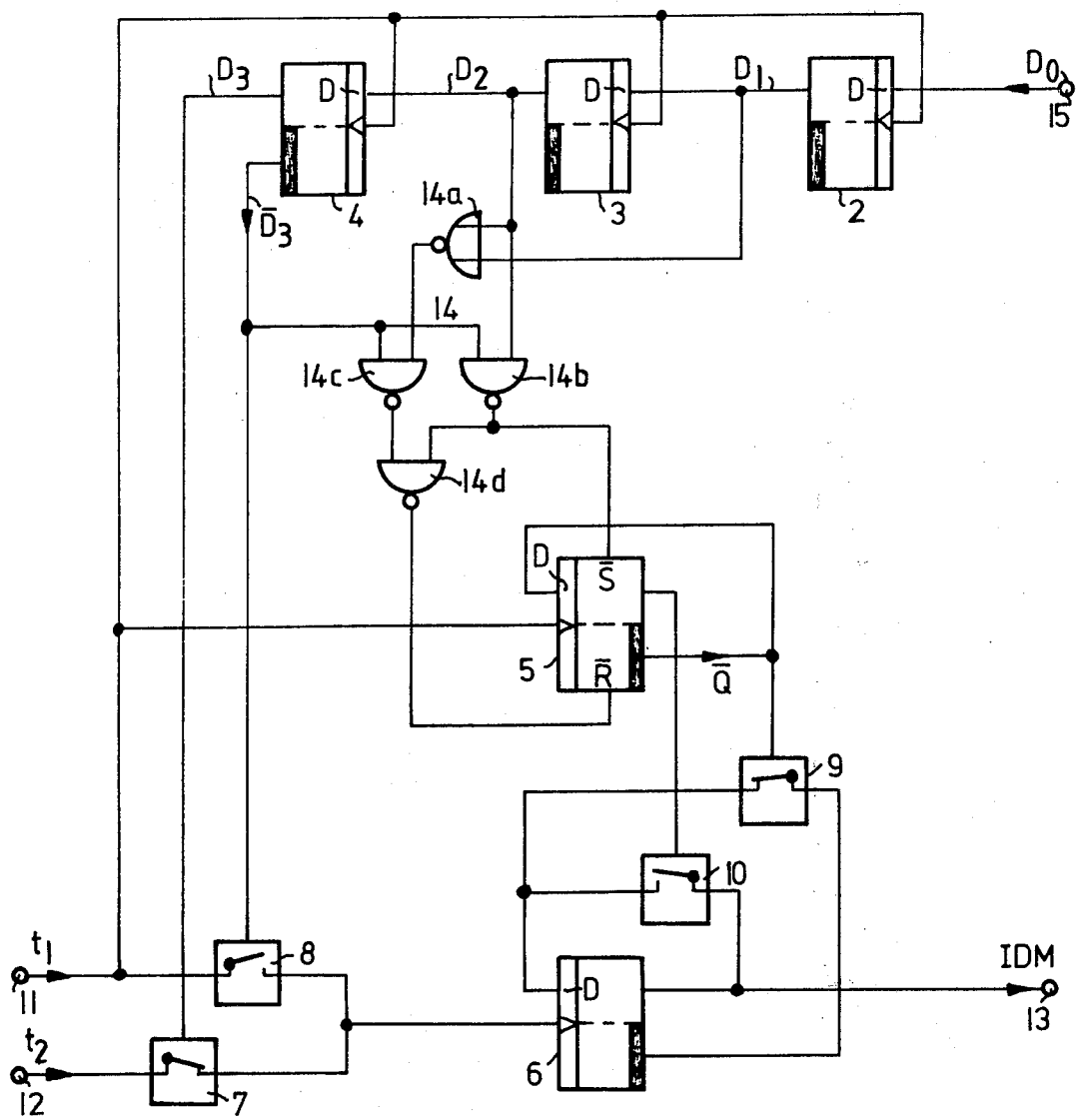
FIG. 3 is a circuit diagram of a preferred embodiment of a modulation circuit according to the invention.
FIG. 3a is a truth table of the operation of the circuit of FIG. 3.
Figure 4:
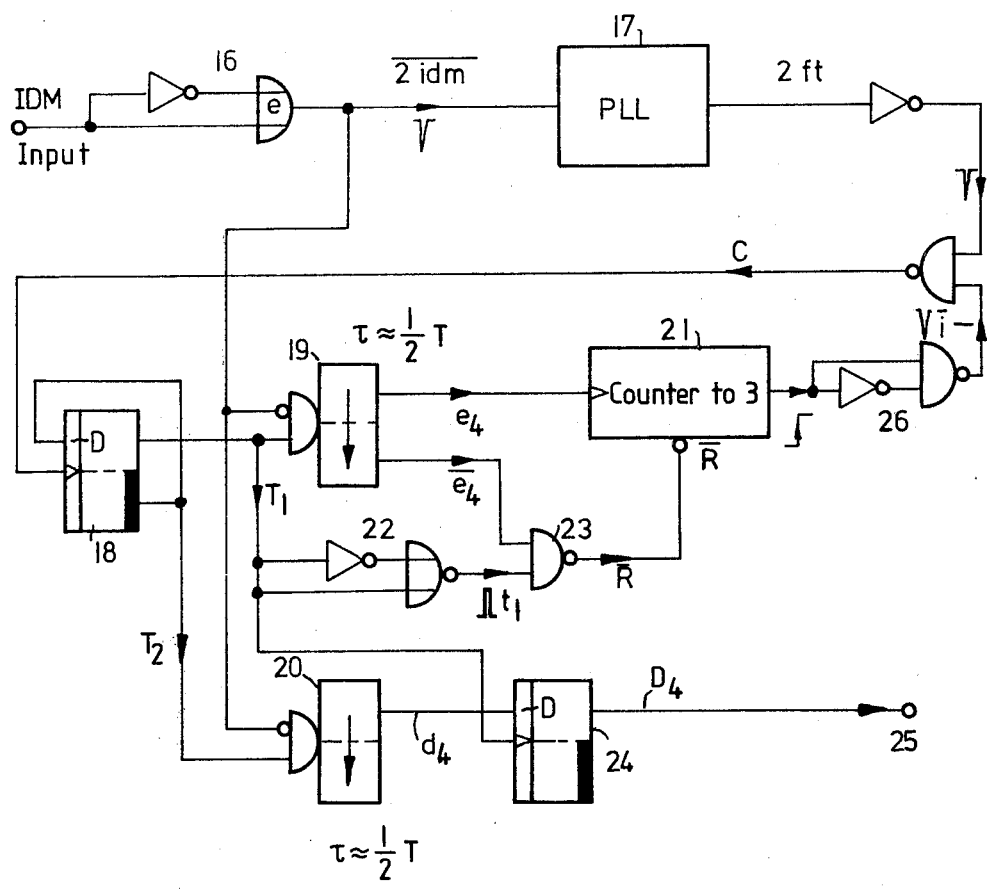
FIG. 4 is a circuit diagram of a preferred embodiment of a demodulation circuit according to the invention.

FIGS. 3 and 4 show a modulation circuit and a demodulation circuit for practicing the above-described method according to the invention. These circuits are exemplary only. Of course, details of these circuits may be modified based on the above-identified conditions.

FIG. 3 shows a modulation circuit, composed of D-flip-flops 2, 3, 4, 5 and 6, logic circuit 14 and electronic switches 7, 8, 9 and 10, for generating an IDM signal consistent with signal IDM1 of FIG. 1. The truth table of FIG. 3a and the signal diagrams shown in FIG. 5 illustrate the operation of this circuit. In addition to the input signal, constituted by a binary sequence $D_0$, at input terminal 15 (not shown in FIG. 5), the circuit requires two clock pulse signals $t_1$ and $t_2$ applied to input terminals 11 and 12, respectively, and each having a repetition frequency equal to that of the binary sequence to be transmitted. With respect to phase, each pulse of $t_1$ coincides with the boundary between successive bit intervals and each pulse of $t_2$ is in the middle of a respective bit interval. The heart of the modulator is flip-flop 6. The switches 7 and 8 are controlled by the modulating signal $D_3$ provided by the direct output of flip-flop 4. The positions of switches 7 and 8, which are always opposite one another, determine whether the flip-flop 6 is triggered to switch in the middle or at the end of the bit interval. The switches 9 and 10 are similarly controlled by the output state of flip-flop 5. The positions of the switches 9 and 10 determine whether the flip-flop 6 switches at all.

If the output signal $D_3$ has the logic "1" value, the switches 7 and 9 are closed, and switches 8 and 10 are open, as shown, i.e. the flip-flop 6 will always be switched by a $t_2$ pulse in the middle of the bit interval.

If, however, $D_3$ has the logic "0" value, switch 8 is closed. The result is that the output state of flip-flop 6 switches at the end of the bit interval. The positions of switches 9 and 10 determine which logic signals will follow in the IDM signal at output 13, the bit value currently represented by signal $D_3$. In order to make the two next following bits, represented by signals $D_2$ and $D_1$ at the direct outputs of flip-flops 3 and 2, available, flip-flops 2 through 4 are connected to form a shift register. The binary signal $D_0$ to be modulated is fed to the flip-flops and appears after three clock pulses as signal $D_3$ at the output of flip-flop 4. The signals $D_1$ and $D_2$ at the outputs of the flip-flops 2 and 3 thus correspond to the two next following logic signals.

By means of a linkage circuit 14 composed of a NOR gate 14a and NAND gates 14b, 14c and 14d, the output state of flip-flop 5 is controlled as a function of the values of three successive bits and itself controls the positions of switches 9 and 10. The linkage of the signals is effected in such a manner that the above-stated conditions are met during the formation of the IDM signal. The dependence of the control voltage $\overline{Q}$ at the complement output of flip-flop 5 for controlling the switch 9 on the values $D_1$ through $D_3$ is shown in the truth table at the bottom of FIG. 3. It must be noted that the response of the flip-flop 6 to one clock pulse $t_1$ is determined by its state existing just prior to this clock pulse. If switch 10 is closed and switch 9 open, the output state of flip-flop 6 is unchanged. When the states of switches 9 and 10 are reversed, each clock pulse $t_1$, or $t_2$, inverts the output state of flip-flop 6. The first row of the truth table of FIG. 3 shows a signal pattern which will produce the complement of the previous output value at $\overline{Q}$, if the values $D_1$, $D_2$ and $D_3$ are logic "0" in the moment before the pulse $t_1$ appears (FIG. 5).

The output value of flip flop 6 changes with pulse $t_1$ when the previous signal $\overline{Q}$ is logic "1" (FIG. 5).

The IDM signal obtained in this way, just like the DM signal, contains level changes which can occur only in spacings of one bit interval, one and a half bit intervals and two bit intervals. The maximum direct voltage component in the IDM signal is likewise equal to that of the DM signal, namely ⅛. The spectrum of the IDM signal is also almost identical to the spectrum of the DM signal. For that reason, these signals have corresponding transmission characteristics. The advantage of the IDM signal, however, is that it permits detection of the two clock pulse phases $t_1$ and $t_2$ to be made from the IDM signal itself more easily and reliably. Such detection, or identification, of the clock pulse phases $t_1$ and $t_2$ will be described below in connection with the demodulation circuit shown in FIG. 4 and with the aid of the signal diagrams shown in FIG. 6.

In the demodulator of FIG. 4, the IDM signal from the modulator is first differentiated in a differentiator 16 composed of an inverter and an OR gate to form a pulse train signal "2idm" composed of one pulse for each IDM signal level change. Signal 2idm is supplied to a PLL circuit 17 which generates pulse spikes at the frequency $2 f_t$ which is equal to twice the reciprocal of the shortest period between the pulses 2idm. A D-flip-flop 18 is used to obtain therefrom mutually complementary phase switching square wave voltages $T_1$ and $T_2$ each having a repetition rate corresponding to the clock pulse frequency of the transmitted binary sequence. Two monostable multivibrators, or monoflops, 19 and 20 having on, or unstable state, times of about ½T (half of a bit interval) are provided which via series-connected AND gating circuits can be triggered by the negative going edges of the signal 2idm. The gating circuits of the monostable multivibrators 19 and 20 are actuated if the switching voltages $T_1$ and $T_2$, respectively, are logic "1". The switching voltages $T_1$ and $T_2$ have respectively opposite phases. They cause one or the other of the monostable multivibrators 19 and 20, to be triggered by each of the pulses of the signal 2idm. Since the phase position of the demodulated IDM signal with respect to the bit interval pattern has not yet been identified, it is uncertain at the moment which monostable multivibrator 19 or 20, respectively, is emitting the demodulated binary sequence at its output.

For identification, the output pulses $e_4$ of the monostable multivibrator 19 are counted in a series-connected counter 21. The counter 21 is reset whenever during one clock pulse, corresponding to the period of $T_1$ there is no pulse $e_4$. The reset pulse $\overline{R}$ for resetting the counter is derived from the switching voltage $T_1$ by means of a differentiator 22 and a NAND gate 23. By means of the counter 21, a constant check is made whether the initially arbitrarily established association of the pulses of the signal 2idm with the logic signals "0" and "1" is correct. If those pulses of signal 2idm associated with the logic signal "0" coincide with the switching voltage $T_1$ and thus the monostable multivibrator 19 is triggered by these pulses, the counter 21 can never reach a count of 3. The counter 21 is, for example, a counter set to count to three and then produce an output signal. The fact that the counter 21 never reaches its highest counting state indicates that the association of the switching voltages $T_1$ and $T_2$ with the pulses of the signal 2idm has been made correctly. In this case the output signal $d_4$ at the output of the monoflop 20 contains the correct binary sequence. A D-flipflop 24 which is triggered by the switching voltage $T_1$ is used to form a binary sequence $D_4$ corresponding to the original sequence $D_0$ from the signal $d_4$ and to feed it to the output terminal 25 of the demodulation circuit.

If, however, the counter 21 does reach its count of 3, this is a sign that the clock pulses $T_1$ and $T_2$ have been interchanged. In that case, the signal $e_4$ contains the correct binary sequence. The signal then appearing at the output of the counter 21 is differentiated in a differentiating circuit 26 and fed to the clock pulse input of the flip-flop 18 as an additional pulse $\bar{i}$. This additional clock pulse causes the switching voltages $T_1$ and $T_2$ to undergo a reversal in phase. After this reversal in phase, the association between the phases of $T_1$ and $T_2$, on the one hand, and those of clock pulses $t_1$ and $t_2$, on the other hand, is exchanged once more and the correct binary sequence appears at output 25. If there is no interference during the operation, no further identification process is required after the described switching process. If, however, interference does occur, the phase can always be identified and corrected again.

FIG. 7 shows an example of which pulses in the circuit of FIG. 4 appear during the identification process if the wrong clock pulse phase is initially identified. The first line of FIG. 7 shows that the phase of $T_1$ corresponds to the phase of $T_2$ in FIG. 6. As a result, the signal $e_4$ initially contains the sequence to be recovered, corresponding to signal $d_4$ in FIG. 6. Upon appearance of the third successive pulse at a repetition rate equal to that of the original binary sequence, counter 21 produces an output which results in the generation of a pulse $\bar{i}$ which, because of the delay provided by multivibrator 19, is inserted between two successive pulses at frequency $2f_t$ to give the pulse train c an extra pulse that reverses the phases of the switching voltages $T_1$ and $T_2$ and this establishes the proper phase relation between those voltages and signal IDM.

The demodulation circuit shown in FIG. 4 is merely one example of a suitable arrangement. The information contained in the received IDM signal regarding the correct clock pulse phase can also be utilized and evaluated in a different manner in the IDM demodulator. For identification it is determined whether there are more than two successive level changes with a spacing of one bit interval. If with interference-free signals at least three successive level changes are detected with spacings of one bit interval, these level changes can unequivocally be associated with the logic binary value "1". This unequivocally establishes the position of the level changes with respect to a bit pattern. For all subsequent level changes this bit pattern can be used as the basis.

Identification is possible only if three logic signals "1" appear in succession in the transmitted binary sequence. This identification process which is already completed as soon as there are three consecutive "1"'s can be improved yet with respect to freedom from interference. If only three successive bit signals are evaluated, falsification of a single signal can cause a false identification which leads to the setting of the wrong evaluation phase.

The increase in freedom from interference can be realized very easily in the described IDM. The counter 21 for the zero passages appearing without gaps therebetween need only be set to a higher final count value. This counter 21 starts counting from zero again after every missing zero passage. An increase in the final counter value to, for example, 8 is certainly permissible for the transmission of PCM audio signals with 14 or 16 bit resolution, respectively, in a two-complement code. An identification process then required would hardly be delayed thereby since in the range of zero passages of analog audio signal there would always occur longer sequences of successive "1"'s. A false identification with a final counter value of 8 is possible only if accidentally, as a result of interference, a series of at least 8 uninterrupted zero passages associated with the "0"'s would occur. This, however, is already rather unlikely (see FIG. 1).

In order to assure as rapid an identification as possible, it may be of advantage to have the binary sequence preceded by a sequence of logic "1" signals or to provide such a sequence in a frame signal which serves, for example, to define a code word in the binary sequence. A higher number of successive logic "1"'s may also be provided (e.g. 4 or 8) in which case the counter 21 can be designed to reach a correspondingly higher final value. In this way it is accomplished that a once correctly set evaluation phase can hardly be influenced any more by interference pulses as long as the PLL circuit does not fall out of step.

It is also possible to interchange the association of the signals "1" and "0" with respect to the level changes. In that case the signal "1" would be represented as a level change at the end of the bit interval, if a further logic "1" follows. The signal "0" would then correspond to a level change in the middle of a bit interval. The association of the two binary signals with the level changes can be interchanged without difficulty, for example, by providing an inverter ahead of the modulator and an inverter behind the demodulator. In principle it applies that the transmitted signal level changes associated with each binary value have a respective fixed phase with respect to the bit interval, and the phases of level changes associated with one binary value differ from those associated with the other binary value by one-half of a bit interval.

The statements regarding the middle and end of a bit interval as used herein are not to be considered to be absolute. They are only intended to indicate that the phases of the level changes associated with the two binary signals differ from one another by one-half of a bit interval.

The fact that the absolute phase can be different can be clarified with the example of the modulation circuit of FIG. 3: the identical-phase binary sequences $D_1$, $D_2$ and $D_3$ do not have to coincide with the phase of the binary sequence $D_0$. The clock pulse signal $t_1$ will be selected in such a manner that the clock pulses fall approximately into the middle of the bit intervals of the binary sequence $D_0$ so as to assure correct transfer of the binary sequence $D_0$ into the shift register 2, 3, 4. This alone provides a shift in the absolute phase by about one-half of a bit interval.

It is to be understood that the above description of the present invention is susceptible to various modifications, changes and adaptations, and the same are intended to be comprehended within the meaning and range of equivalents of the appended claims.

What is claimed is:

1. In a method for converting a binary sequence composed of a succession of bits, each having a value of "1" or "0", occurring in successive bit intervals, into a transmitted signal containing a representation of each bit, by representing a bit of one value as a change in the level of the transmitted signal at a time corresponding to the middle of the associated bit interval, and representing a bit of the other value as a change in the level of the transmitted signal at a time corresponding to the end of the associated bit interval if a further bit of the other value follows, the improvement comprising in part suppressing signal level changes associated with the bits of the other value for causing the time period between level changes in said transmitted signal to be no longer than the period of two bit intervals and for preventing the occurrence of more than two consecutive level changes at intervals equal to each bit interval and associated with the bits of the other value.

2. A modulator for converting a binary sequence composed of a succession of bits, each having a value of "1" or "0", occurring in successive bit intervals, into a transmitted signal composed of successive portions each containing a representation of a respective bit, comprising: first circuit means connected to detect the values of three successive bits to provide input values for derivation of a transmitted signal portion representing the first occurring one of the three bits; and second circuit means connected to said first circuit means to receive the input values and derive therefrom the transmitted signal such that each bit of one value is represented as a change in the level of the transmitted signal at a time corresponding to the middle of the associated bit interval, each bit of the other value is represented as a change in the level of the transmitted signal at a time corresponding to the end of the associated bit interval if a further bit of the other value follows, transmitted signal level changes associated with bits of the other value are in part suppressed to cause the time period between level changes in the transmitted signal to be no longer than the period of two bit intervals, and the occurrence of more than two consecutive level changes at intervals equal to each bit interval and associated with the bits of the other value is prevented.

3. Modulator as defined in claim 2 wherein said first circuit means comprise a shift register into which each successive bit of the binary sequence is read by means of clock pulses, and a logic linkage mechanism coupled to the stages of said shift register and producing at least one of said input values for derivation of the transmitted signal.

4. Modulator as defined in claim 3 wherein said second circuit means comprise: a clock pulse controlled flip-flop connected to receive, depending on the binary value of the bit for which a transmitted signal portion is to be derived, either a pulse of a first pulse train associated with the other bit value or a pulse of a second pulse train associated with the one bit value; and control means connected for causing the at least one input value produced by said logic linkage mechanism to determine whether said flip-flop is influenced by the received clock pulse or not.

5. Modulator as defined in claim 4 wherein said flip-flop is a D-flip-flop, and said control means comprises electronic switches coupling the outputs of said D-flip-flop with the D-input of said D-flip-flop in such a manner as to cause application of a clock pulse of the first train to cause the state of said flip-flop existing before such clock pulse to determine whether said flip-flop changes its state or not.

6. Demodulator for recovering a binary sequence composed of a succession of bits, each having a value of "1" or "0", occurring in successive bit intervals, from a transmitted signal containing a representation of each bit in that a bit of one value is represented as a change in the level of the transmitted signal at a time corresponding to the middle of the associated bit interval, a bit of the other value is represented as a change in the level of the transmitted signal at a time corresponding to the end of the associated bit interval if a further bit of the other value follows, transmitted signal level changes associated with bits of the other value are in part suppressed to cause the time period between level changes in said transmitted signal to be no longer than the period of two bit intervals, and the occurrence of more than two consecutive level changes at intervals equal to each bit interval and associated with the bits of the other value is prevented, said demodulator comprising: pulse forming means connected for forming a pulse in response to each level change of the transmitted signal; pulse regenerating means connected to receive the pulses formed by said pulse forming means for generating a train of pulses having a repetition rate equal to twice the repetition rate of the binary sequence; switching voltage generator means connected to receive the pulses produced by said regenerating means for generating two periodic switching voltages differing from one another in phase by 180° and each having a repetition rate equal to that of the binary sequence; gating means connected to receive the pulses formed by said pulse forming means and the switching voltages for utilizing the switching voltages as gating signals and for producing signals representative of the time relation between the pulses formed by said pulse forming means and each of the switching voltages; and an identification circuit connected to receive signals produced by said gating means for producing a signal identifying the switching voltage associated in phase with at least three consecutive transmitted signal level changes at intervals equal to each bit interval.

7. Demodulator as defined in claim 6 wherein said identification circuit comprises a counter connected to count pulses formed by said pulse forming means in synchronism with one of the switching voltages and to produce an output signal upon counting a given number of such pulses occurring at successive intervals equal to the period of one bit interval, which number is at least three.

8. Demodulator as defined in claim 7 wherein the given number of such pulses is greater than three.

9. Demodulator as defined in claim 8 wherein a signal containing, at regular intervals, a bit sequence suitable for the identification process is fed to said demodulator.

10. Demodulator as defined in claim 7 wherein said counter counts each pulse formed by said pulse forming means in synchronism with one of said switching voltages, and is reset to its starting state whenever a pulse is not formed by said pulse forming means in synchronism with said one switching voltage.

11. Demodulator as defined in claim 7 wherein said gating means comprise two monostable multivibrators each having a trigger input and providing pulse signals in response to each signal at its trigger input; two gate circuits each connected to receive the pulses formed by said pulse forming means and a respective one of the switching voltages and to supply a signal to the trigger input of a respective monostable multivibrator upon the occurrence of each pulse formed by said pulse forming means in time coincidence with the associated switching voltage; and means connected for supplying output pulse signals produced by one of said multivibrators to said identification circuit for counting in said counter, means connected for recovering a representation of the binary sequence from the output pulse produced by the other one of said multivibrators; and wherein said identification circuit operates to interchange the phases of the switching voltages upon production of an output signal by said counter.

12. Demodulator as defined in claim 6, 7, 8, 9, 10 or 11 wherein said switching voltage generator means comprise a flip-flop having a trigger input connected to receive the pulses produced by said regenerating means, and a direct output and a complement output each providing a respective switching voltage, and said identification circuit supplies an additional pulse to said trigger input of said flip-flop upon production of an identifying signal by said identification circuit for thereby interchanging the phases of the switching voltages.

* * * * *